United States Patent Office 3,543,567
Patented Dec. 1, 1970

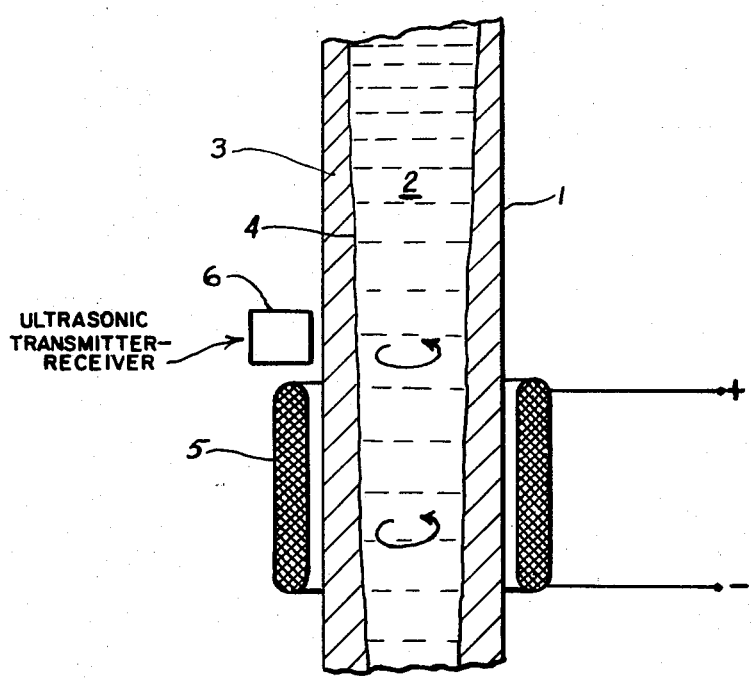

3,543,567
METHOD OF INTENSIFYING REFLECTION OF ULTRASONIC WAVES FROM BOUNDARY BETWEEN SOLID AND LIQUID METAL
Benno Lux and Wilfried Kurz, Geneva, Switzerland, assignors to Concast AG, Zurich, Switzerland
Filed Nov. 20, 1967, Ser. No. 684,530
Int. Cl. G01n 9/24
U.S. Cl. 73—67.7　　　　　　　　　　　　　2 Claims

ABSTRACT OF THE DISCLOSURE

In a method of locating the solidification front in a metal casting by measuring the amplitude of ultrasonic waves reflected from the boundary between the solid and liquid phases, the boundary is more sharply defined to intensify the reflection of the waves by agitating the liquid phase at the point of measurement—by mechanical agitation or by applying a rotating magnetic field.

---

The present invention relates to a method for improving the determination of the start-of-freeze location in metal casting, and particularly in continuous casting, in which the postiion of the solidification front is ascertained by means of ultrasonic waves.

It is known to locate the solidification front by measuring the amplitude of ultrasonic waves reflected from the boundary between the solid and liquid phases. Apparatus and a method for locating the solidification front in this manner is disclosed in U.S. Pat. Ser. No. 3,270,376, Sept. 6, 1966 to A. Thalmann. Since the start of freezing of metals usually does not proceed evenly, depending on the conditions of solidification, for example, due to dendritic growth, mushy freezing, nonuniform heat extraction, etc., the reflecting effect of the interface between the phases is substantially reduced for ultrasonic waves. As a result, the echo amplitude of the start of freezing becomes smaller than the noise level of the sound head, and the interface then cannot be located. This is the case when the unevenness exceeds one-tenth of the acoustic wavelength. In the case of steel, for example, the acoustic wavelength is about 5 mm. at freezing temperature. However, the acoustic wavelength cannot be reduced at will since the requisite increase in frequency is accompanied by increased attenuation.

It is the object of the present invention to intensify the reflection of ultrasonic waves at the solidification front in order to receive more distinct signals of the solidification front.

This objective is attained by agitating the melt at the point of measurement. This has the effect of breaking off the dendrites which project into the melt and of narrowing the region of mushy freezing. Moreover, the unevenness due to nonuniform heat extraction is thereby equalized.

The method is put into practice by producing a rotating field at the point of measurement by known means, such as electromagnetic agitating coils, with the magnetic coupling to the metal melt inducing a flow at the start of freezing.

In the case of low-melting metals, the melt may also be stirred mechanically in known manner.

The method described is applicable not only to continuous casting but also to ingot casting of metals, for example.

Apparatus for carrying out the method of this invention is illustrated in the accompanying schematic drawing of apparatus showing it arranged relative to a cast strand.

In the drawing a cast strand 1 has a liquid phase, or core 2 within a solid phase defined by a solidified shell 3, the boundary between the solid and liquid phases being indicated at 4. The boundary is more sharply defined for locating the solidification front more precisely by agitating the liquid phase at the boundary. This is suitably accomplished by applying a rotating magnetic field to the strand in the area at which the location of the boundary is to be measured by a coil 5 around the strand adapted to be energized by a suitable source of electric power indicated by the positive and negative terminal shown. Electromagnetic stirring of metal is analogous to the operation of an induction motor. When a magnetic field is moved with respect to an electrically conducting material, currents are induced in that material. These currents, in effect, create a secondary magnetic field of such polarity that the interaction between the primary and secondary fields results in a force which tends to drag the conducting material along with the primary field (Lenz's Law). The force exerted on the conducting material is directly proportional to the square of the intensity of the primary field, and inversely proportional to the resistivity of the material. In electromagnetic stirring, the pole pieces surrounding the strand can be compared with the stator of an induction motor, while the molten metal acts like a rotor. Thus, agitation of the molten metal is caused by the torque resulting from the interaction between the magnetic fields of the "stator" and the "rotor." Such a process for agitation of liquid metal is shown for instance in U.S. Pat. No. 2,877,525.

The location of the boundary is determined by a conventional ultrasonic detection device 6 which is an ultrasonic transmitter-receiver which applies ultrasonic waves to the strand and measures the amplitude of the waves reflected from the boundary 4 between the solid and liquid phase in the manner described in U.S. Pat. No. 3,270,376 issued Sept. 6, 1966 to A. Thalmann. As is known such detection devices 6 incorporate an ultrasonic emitter for producing the waves and a receiver for receiving the echo of the waves from boundary and indicating the amplitude of the echo waves.

I claim:
1. A method of locating the solidification front in a metal casting comprising agitating the liquid phase in the area of the boundary between the solid and liquid phases of the metal in the casting whereby the boundary is more sharply defined, applying ultrasonic waves to said area, and measuring the amplitude of the ultrasonic waves reflected from the boundary.
2. The method of claim 1 in which said agitation is provided by applying a rotating magnetic field in said area.

References Cited

UNITED STATES PATENTS

| | | | |
|---|---|---|---|
| 3,237,251 | 3/1966 | Thalmann | 164—4 |
| 3,270,376 | 9/1966 | Thalmann | 164—4 |

JAMES J. GILL, Primary Examiner